US005737549A

United States Patent [19]
Hersch et al.

[11] Patent Number: 5,737,549
[45] Date of Patent: Apr. 7, 1998

[54] METHOD AND APPARATUS FOR A PARALLEL DATA STORAGE AND PROCESSING SERVER

[75] Inventors: Roger D. Hersch, Lausanne; Bernard Krummenacher, Chavannes, both of Switzerland

[73] Assignee: Ecole Polytechnique Fédérale de Lausanne, Lausanne, Switzerland

[21] Appl. No.: 188,589

[22] Filed: Jan. 31, 1994

[51] Int. Cl.$^6$ .................................................. G06F 13/00
[52] U.S. Cl. ........................ 395/309; 395/806; 395/119; 395/505; 395/508; 395/520
[58] Field of Search .................... 364/522; 395/600, 395/200.01, 575, 325, 200.03, 309, 806; 370/85.1

[56] References Cited

U.S. PATENT DOCUMENTS

| | | | |
|---|---|---|---|
| 4,985,856 | 1/1991 | Kaufman et al. | 364/522 |
| 5,163,131 | 11/1992 | Row et al. | 395/200 |
| 5,301,310 | 4/1994 | Isman et al. | 395/575 |
| 5,361,385 | 11/1994 | Bakalash | 395/124 |
| 5,377,333 | 12/1994 | Nakagoshi et al. | 395/325 |
| 5,422,987 | 6/1995 | Yamada | 395/127 |

OTHER PUBLICATIONS

"Maximizing Performance in a Stripped Disk Array", P. A. Chen, D. A. Patterson; Proceedings IEEE International Symposium on Computer Architecture, Seattle, pp. 322–331, Jun. 1990.

"Raster Rotation of Bilevel Bitmap Images", R. D. Hersch, Eurographics 85 Proceedings, (Ed. C. Vandoni), North–Holland, pp. 295–308, Jun. 1985.

"Thinking Machines nears database market (Thinking Machines Corp. releases two low–end parallel processors)", Electronic News (1991), v38, n1935, p. 18(1), Oct. 1992.

*Primary Examiner*—Thomas G. Black
*Assistant Examiner*—Hosain T. Alam
*Attorney, Agent, or Firm*—Joseph Page

[57] ABSTRACT

The present invention concerns a parallel multiprocessor-multidisk storage server which offers low delays and high throughputs when accessing and processing one-dimensional and multi-dimensional file data such as pixmap images, text, sound or graphics. The invented parallel multiprocessor-multidisk storage server may be used as a server offering its services to a computer, to client stations residing on a network or to a parallel host system to which it is connected. The parallel storage server comprises (a) a server interface processor interfacing the storage system with a host computer, with a network or with a parallel computing system; (b) an array of disk nodes, each disk node being composed by one processor electrically connected to at least one disk and (c) an interconnection network for connecting the server interface processor with the array of disk nodes. Multi-dimensional data files such as 3-d images (for example tomographic images), respectively 2-d images (for example scanned aerial photographs) are segmented into 3-d, respectively 2-d file extents, extents being striped onto different disks. One-dimensional files are segmented into 1-d file extents. File extents of a given file may have a fixed or a variable size. The storage server is based on a parallel image and multiple media file storage system. This file storage system includes a file server process which receives from the high level storage server process file creation, file opening, file closing and file deleting commands. It further includes extent serving processes running on disk node processors, which receive from the file server process commands to update directory entries and to open existing files and from the storage interface server process commands to read data from a file or to write data into a file. It also includes operation processes responsible for applying in parallel geometric transformations and image processing operations to data read from the disks and a redundancy file creation process responsible for creating redundant parity extent files for selected data files.

30 Claims, 9 Drawing Sheets

| e0 | e1 | e2 | e3 | e4 | e5 |
Fig. 5a
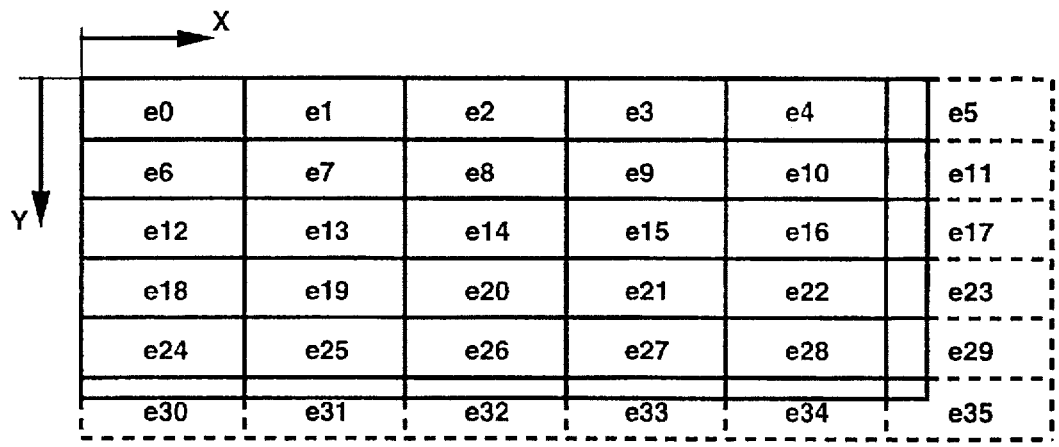
Fig. 5b
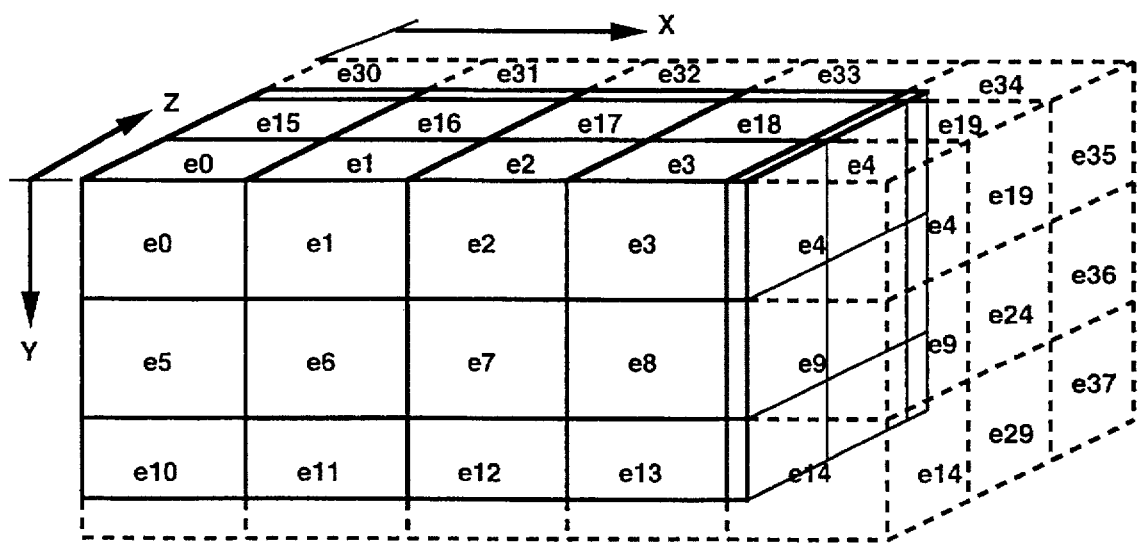
Fig. 5c

| d0 | d1 | d2 | d3 | d4 | d5 | d6 | d7 | d8 | d0 | d1 |
|----|----|----|----|----|----|----|----|----|----|----|
| d2 | d3 | d4 | d5 | d6 | d7 | d8 | d0 | d1 | d2 | d3 |
| d4 | d5 | d6 | d7 | d8 | d0 | d1 | d2 | d3 | d4 | d5 |
| d6 | d7 | d8 | d0 | d1 | d2 | d3 | d4 | d5 | d6 | d7 |
| d8 | d0 | d1 | d2 | d3 | d4 | d5 | d6 | d7 | d8 | d0 |

9 disks:

d0: 2 accesses
d1: 1 access
d2: 2 accesses
d3: 2 accesses
d4: 2 accesses
d5: 2 accesses
d6: 2 accesses
d7: 2 accesses
d8: 1 access

Fig. 6a

| d0 | d1 | d2 | d3 | d4 | d5 | d6 | d7 | d8 | d0 | d1 | d2 |
|----|----|----|----|----|----|----|----|----|----|----|----|
| d3 | d4 | d5 | d6 | d7 | d8 | d0 | d1 | d2 | d3 | d4 | d5 |
| d6 | d7 | d8 | d0 | d1 | d2 | d3 | d4 | d5 | d6 | d7 | d8 |
| d0 | d1 | d2 | d3 | d4 | d5 | d6 | d7 | d8 | d0 | d1 | d2 |
| d3 | d4 | d5 | d6 | d7 | d8 | d0 | d1 | d2 | d3 | d4 | d5 |

9 disks:

d0: 3 accesses
d1: 2 accesses
d2: 2 accesses
d3: 3 accesses
d4: 1 access
d5: 1 access
d6: 2 accesses
d7: 1 access
d8: 1 access

Fig. 6b

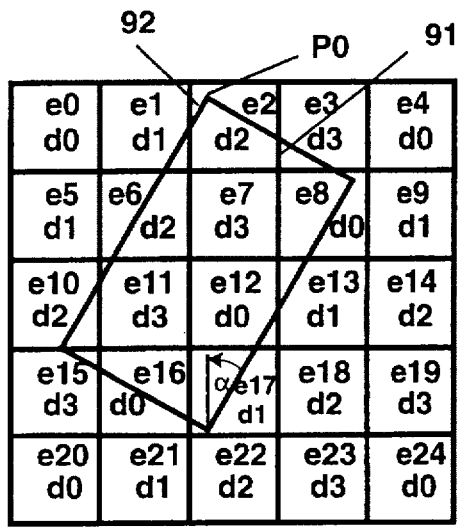
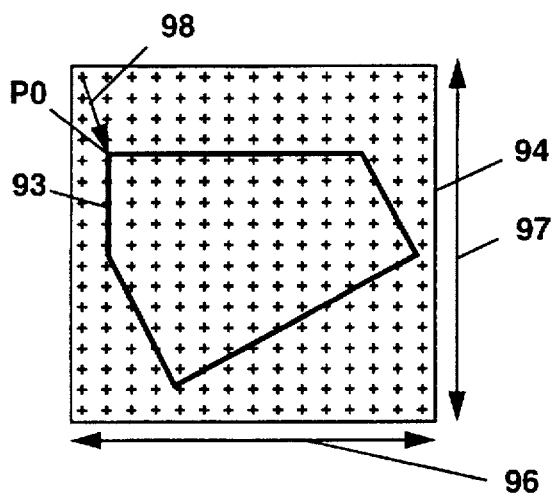
Fig. 9a
Fig. 9b
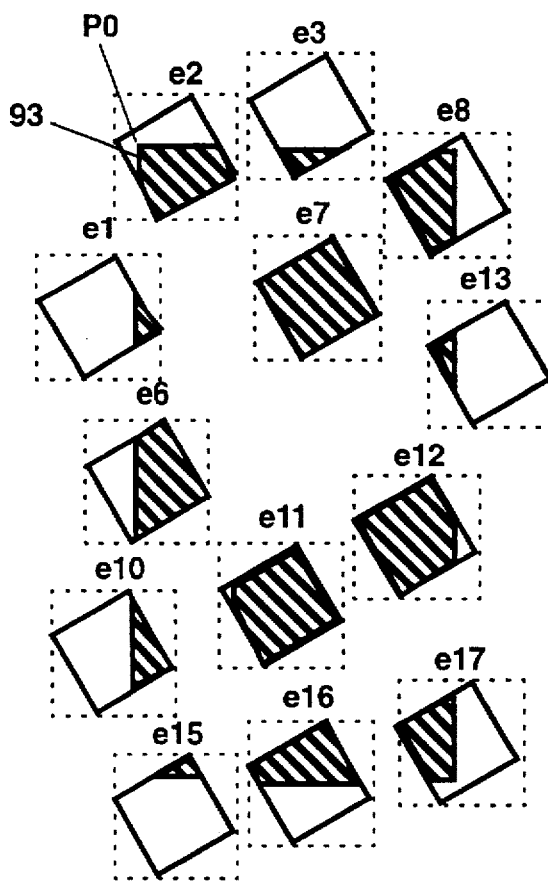
Fig. 9c

METHOD AND APPARATUS FOR A PARALLEL DATA STORAGE AND PROCESSING SERVER

BACKGROUND OF THE INVENTION

Professionals in various fields such as medical imaging, biology and civil engineering require rapid access to huge amounts of pixmap image data files. Today's acquisition devices such as video cameras, still image cameras, medical image scanners, desktop scanners, graphic arts scanners are able to generate huge quantities of pixmap image data. However, existing desktop computers and workstations do not offer sufficient storage bandwidth and processing capabilities for fast browsing and zooming in large pixmap images stored on disks and for applying geometric transformations and image processing operations to large image files. Pixmap image data has to be stored, made accessible and processed for various purposes, such as fast interactive panning through large size images, image zooming For displaying large size images in reduced size windows, image browsing through sequences of independent images, access to video sequences and sound streams, extraction and transformation of given image parts.

File data may consist of 2-dimensional images (for example aerial photographs), 3-dimensional images (for example tomographic scans, video sequences, sets of 2-dimensional images), or one-dimensional data of a specific media (for example sound, text, graphics). File data further comprises compressed images, compressed sound or compressed text. File data also comprises one dimensional, 2-dimensional and 3-dimensional arrays of elements which are of different nature but can be assimilated to arrays of pixels.

Various configurations of prior art computers and disks can be used for storing pixmap images and multiple media data. Single disk systems are too slow to provide the bandwidth necessary for fast browsing through large images or for accessing high-quality video image streams. Disk arrays such as redundant arrays of inexpensive disks, known as RAID systems [ECHEN90], can be used to increase the data bandwidth between mass storage and CPU, but a single CPU driving a disk array does not offer sufficient processing power to apply the image access and processing operations required for example for panning with a limited size visualization window through large images, for displaying reduced views of large images in limited size visualization windows or for applying transformations to given image parts.

The presently invented multiprocessor-multidisk storage server presents a cheaper and more powerful alternative for storage and processing of large files such as 2-d and 3-d pixmap image files, video sequences, sound, text and compressed media data (images, video, sound and text). It may be used as a local network server, as an ATM broadband ISDN server, as a powerful backend server of a host computer or as a storage server For a parallel system.

For the description of the invention, the following terminology is used. The invented server architecture has been created primarily for the storage of image data. Therefore, the underlying parallel file system is explained by showing how image files are stored and accessed. Nevertheless, the concept is more general, and data files which are not images can also be stored, accessed and processed on the invented storage server. The meaning of pixels is generalized to information elements composed of a given number of bytes. The meaning of pixmap images is generalized to arrays of information elements. Furthermore, the concept of pixmap images, which is generally used in the context of 2-dimensional arrays of pixels, is generalized to the third dimension. A 3-dimensional pixmap image is therefore defined as a 3-dimensional array of pixels. Pixels are represented by at least one byte. Data files of any kind may be segmented into extents, extents being one-dimensional for one-dimensional files, 2-dimensional for 2-dimensional files and 3-dimensional for 3-dimensional files. Extents are the parts of a file which may be striped onto different disks at file storage time. Data files include the data as well as metadata associated with the file. For example, an image file includes pixmap image data and metadata specifying various characteristics of the image file, such as its size in each dimension, the size of its extents in each dimension and its colour palette. The metallic of a compressed image file may also contain a table giving the effective size in bytes of each compressed extent.

Accessing rectangular windows from large image files is a frequent operation. image windows are defined as rectangular windows containing an integer number of pixels in each dimension. Image window boundaries may be located at any pixel boundary. When an image file is segmented into extents, aligned image windows are defined as the subset of windows whose boundaries coincide with extent boundaries;.

File storage and access operations are used as a general term for accessing file data. Such accesses comprise data access to image file windows useful for panning purposes and subsampling operations useful for producing scaled-down rectangular image windows displayable in reduced size visualization windows. Both image file window data extraction and subsampling operations require processing power, given in the present apparatus by the parallel processing power of disk node processors which are described in more detail below.

Prior art methods of storing and accessing large sets of pixmap image files are based on high-performance workstations accessing arrays of disks. They do not offer the means to control the distribution of image file parts onto the disks. Furthermore, the workstation's CPU does not offer sufficient processing power to scale down large image files at high-speed in order to display them in limited size visualization windows or to apply to them geometric transformations such as rotations. The presently invented data storage apparatus is based on disk nodes, each disk node being composed by one processor electrically connected to at least one disk. An array built of such closely coupled processor-disk nodes offers both high disk throughput and highly usable parallel processing power. The invented parallel file storage and access method described below provides efficient distribution of files onto disks and high-speed access to requested file windows.

SUMMARY OF THE INVENTION

The present invention concerns a parallel multiprocessor-multidisk storage server which offers low delays and high throughputs when accessing one-dimensional and multi-dimensional file data such as pixmap images, text, sound or graphics. Multi-dimensional data files such as 3-d images (for example tomographic images), respectively 2-d images (for example scanned aerial photographs) are segmented into 3-d, respectively 2-d file extents, each extent possibly being stored on a different disk. One-dimensional files (for example sound or text) are segmented into one-dimensional extents.

The invented parallel multiprocessor-multidisk storage server may be used as a server offering its services to a computer to which it is connected, to client stations residing on a network to which it is connected, or to a parallel host system to which it is connected.

The parallel storage server comprises
(a) a server interface processor interfacing the storage system with a host computer, with a network or with a parallel computing system;
(b) an array of disk nodes, each disk node being composed by one processor electrically connected to at least one disk;
(c) an interconnection network for connecting the server interface processor to the array of disk nodes.

The parallel storage server runs a server interface process expecting serving requests from client processes, a file server process and extent server processes responsible for data storage and access as well as additional processes responsible for geometric transformations and image processing operations, for creating redundancy files and for recovering files in cases of single disk crashes.

The storage server is based on a parallel multi-dimensional file storage system. This file storage system incorporates a file server process which receives from the storage server interface process file creation, file opening, file closing and file deleting commands. It also incorporates extent serving processes which receive from the file server process commands to update directory entries and to open existing files and receive from the server interface process commands to read data from a file or to write data into a file. It further incorporates operation processes responsible for applying in parallel geometric transformations and image processing operations to data read from the disks. It also incorporates redundancy file creation processes responsible for creating redundant parity extent files for selected data files.

When acting as a host backend server, as a network server or as a parallel computer storage server, the server interface process running on the server interface processor receives data access and processing requests, interprets them and decomposes them into file level requests (for example creation, opening, reading, writing and deleting) or into file operation requests (for example geometric transformations, image processing operations). In the case of read requests, the file system interface library decomposes these requests into extent read requests and transmits them to the extent server processes. It waits for the required extent data from the disk nodes, assembles it into the required data window and transmits it to the server interface process which forwards the data to the client process located on the client computer.

When attached to a parallel host system, the storage server made of intelligent disk nodes interacts directly with host processes running on the parallel system. Host processes may simultaneously access either different files or the same file through the file system interface libraries and ask for arbitrarily sized data windows.

Extent serving processes running on disk node processors are responsible For managing the free blocks of their connected storage devices, for maintaining the data structure associated with the file extents stored on their disks, for reading extents from disks, For writing extents to disks, and for maintaining a local extent cache offering fast access to recently used data. At image access time, extent server processes are responsible for accessing extents covered by the required visualization window, extracting the visualization window's content and sending the extent windows to the storage server interface processor. In the case of a zooming operation, the extent server processes subsample the original data in order to produce an image at the required reduced size. Disk node processors may run slave operation processes used for applying geometric transformations such as rotations or other image processing operations to locally retrieved image parts.

The invented parallel file storage server distinguishes itself From the prior art by the Following features:

(1) its file storage system runs on a multiprocessor-multidisk platform and offers 2-d and 3-d image storage and access services requiring simultaneous disk accesses and processing operations such as high-speed panning and zooming in sets of large images;

(2) it comprises information about file sizes in each dimension, about how files are segmented into 1-dimensional, 2-dimensional or 3-dimensional extents and about how extents are distributed on a subset of the available disks;

(3) it provides library procedures for parallel application of geometric transformation and processing operations to data striped on multiple disks;

(4) disk node processors combine parallel file extent accesses from disks and application of the required geometric transformation and processing operations.

The invented parallel file storage server is Further characterized by the Following Features:

(1) it offers services for creating multidimensional (1-d, 2-d, 3-d) image and multiple media Files in addition to conventional files;

(2) it comprises a file server process responsible for global operations such as file creation, file opening and file deleting;

(3) it comprises extent server processes responsible for accessing extents stored on their local disks, for managing a local extent cache and for interacting with the file server to create or delete directory entries;

(4) it comprises operation processes running on disk node processing units capable of applying geometric transformations or image processing operations in parallel to image parts read from the disks, thereby speeding up processing time by a significant Factor;

(5) it comprises redundancy file creation processes capable of generating redundancy Files From given data files;

(6) it comprises a recovery process capable of recovering files in cases of single disk crashes.

The invented parallel image and multiple media server offers the following advantages over the prior art:

(1) disk node processing units are located close to the disks enabling disk file accesses and processing operations to be closely combined (for example pipelined);

(2) the number of disk node processing units and of disks attached to each disk node processing unit can be independently chosen and adapted to the requirements of an application;

(3) due to the fact that the parallel server knows about the dimensionality of an image file and about its access patterns (i.e. for example access to rectangular windows in large image files) and that the parallel file system supports multi-dimensional files segmented into multi-dimensional extents, it is able to segment the file into extents in such a way that file parts are accessed on a multiprocessor-multidisk system in a more efficient way than with a conventional file system using a RAID disk array as its storage device;

(4) Since extents of compressed image files are independently compressed and since the parallel file system supports the storage of extents having a variable size within the same file the advantages mentioned in point (3) apply also in the case of compressed image files.

BRIEF DESCRIPTION OF THE DRAWINGS

FIGS. 5a, 5b and 5c give examples showing how 1-dimensional, 2-dimensional and 3-dimensional files are segmented into extents.

FIG. 6 gives examples of how extent sizes influence the distribution of extents to disks: a well chosen extent size is shown in FIG. 6a which provides quite uniform extent access patterns within a given visualization window and a badly chosen extent size is shown in FIG. 6b which induces a non-balanced extent access pattern.

FIG. 8b shows that extent windows 82 have to be accessed from the disks in order to obtain all extent parts covered by the 2-dimensional window FIGS. 9a, 9b and 9c show an example of a file transformation, where a rectangular window covered by several extents is to be rotated by a specified rotation angle.

DETAILED DESCRIPTION OF THE PREFERRED EMBODIMENTS

Current apparatuses for storing, accessing and processing of image data are based on workstations connected to RAID disk arrays [Chen90]. RAID disk arrays connected to single processor workstations do offer higher storage capabilities as well as a higher throughput than single disks. However RAID disk arrays do not incorporate processing power for performing image scaling operations, image window extraction operations, image transformations or image processing operations. Such operations must be executed by the host processor.

Figure 1:
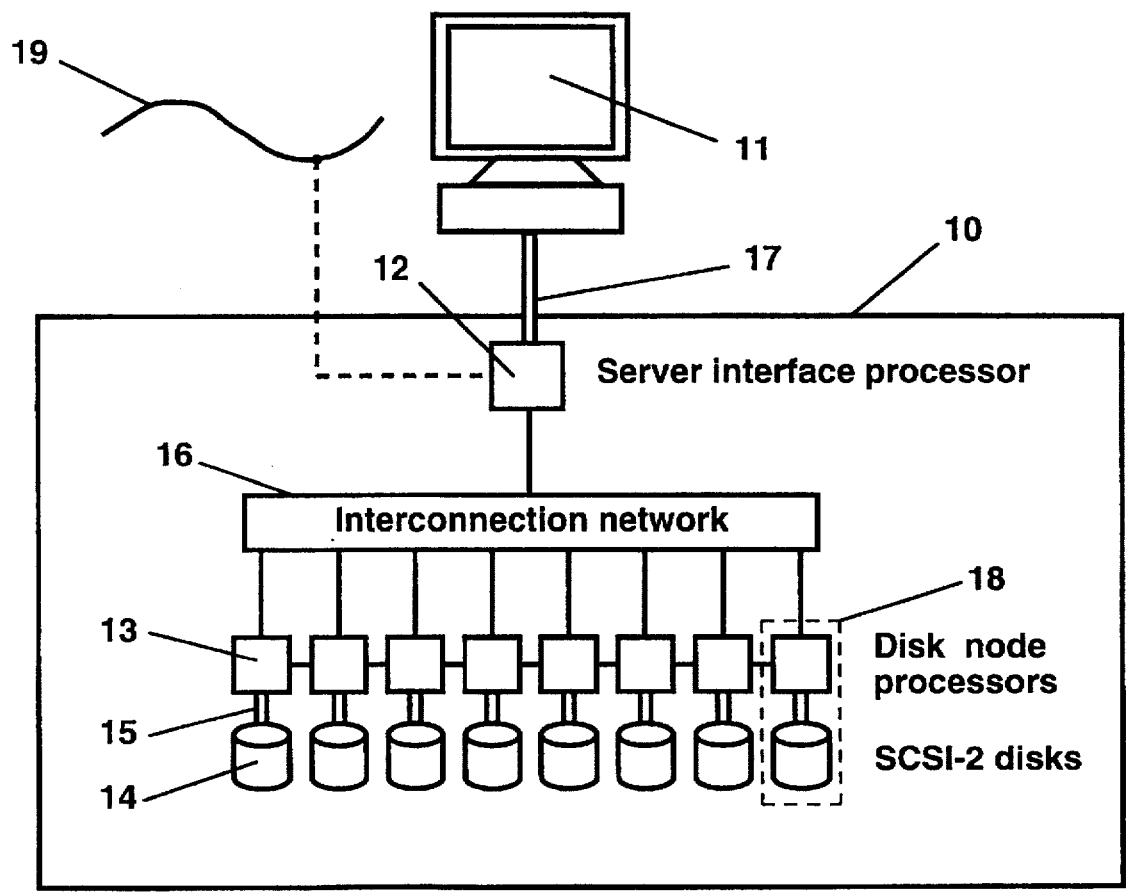
FIG. 1 is a block diagram illustrating an example of a parallel image and multiple media server.

The invented parallel storage server apparatus (FIG. 1) presents a cheaper alternative to image and multiple media storage devices based on workstation and RAID disk arrays. It includes a server interface processor 12 interfacing the storage system with a client computer 11 (host computer) or with a network 19, an array of intelligent disk nodes 18, each disk node being composed of one processor 13 and at least one disk 14, and an interconnection network 16 for connecting the server interface processor to the array of intelligent disk nodes.

The server interface processor 12, the interconnection network 16 and the disk node processors 13 are made of commercially available components, such as T800 or T9000 transputers, communication links and possibly a communication crossbar switch like the Inmos C104 transputer link crossbar switch. The interface processor is either connected to a host station 11, preferably through a SCSI-2 target interface 17 or directly connected to a network 19 with a network interface such as Ethernet, FDDI or ATM broadband ISDN.

Figure 2:
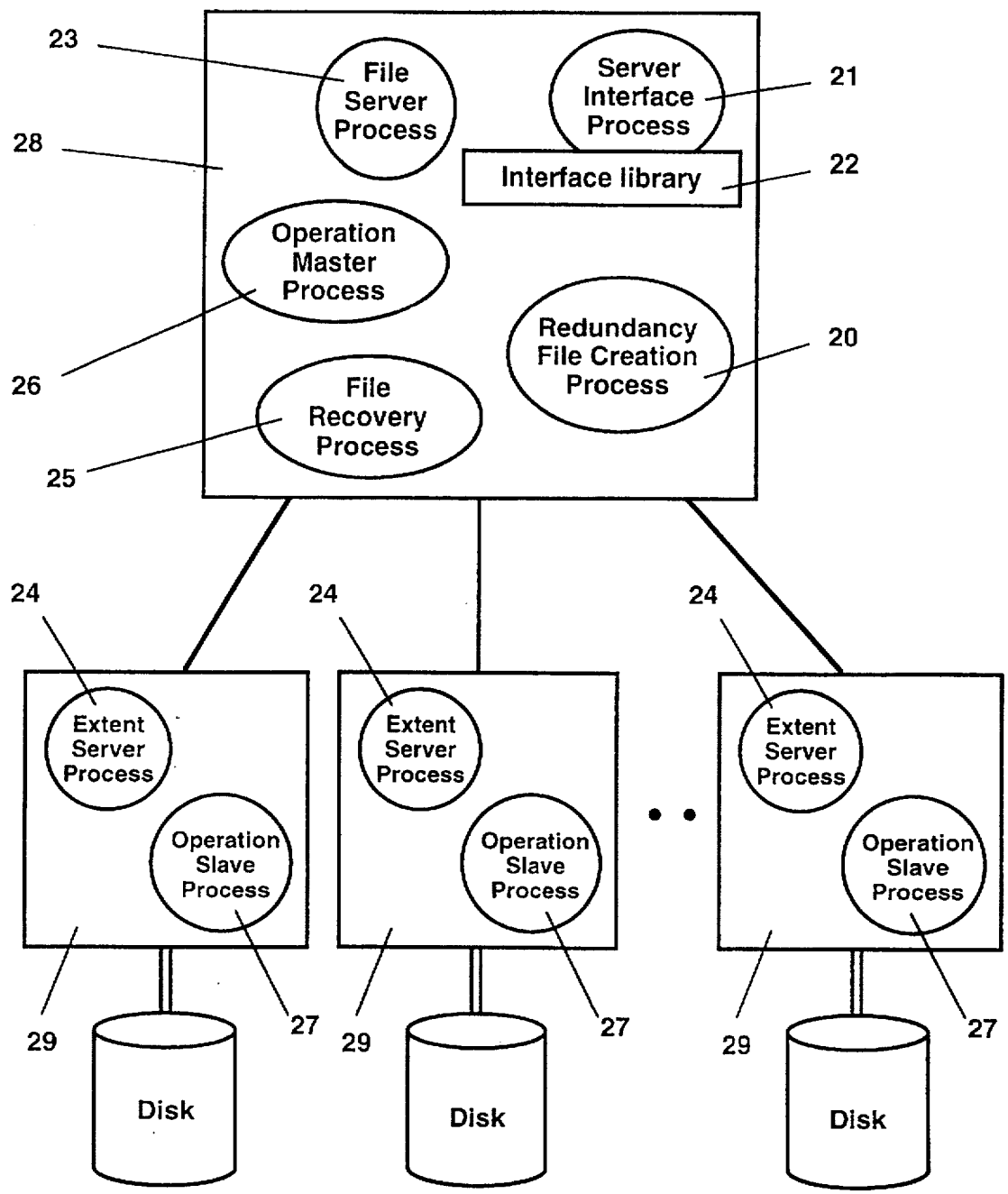
FIG. 2 shows an example of services running on interface processor 28 and on disk node processors 29.
Figure 3:
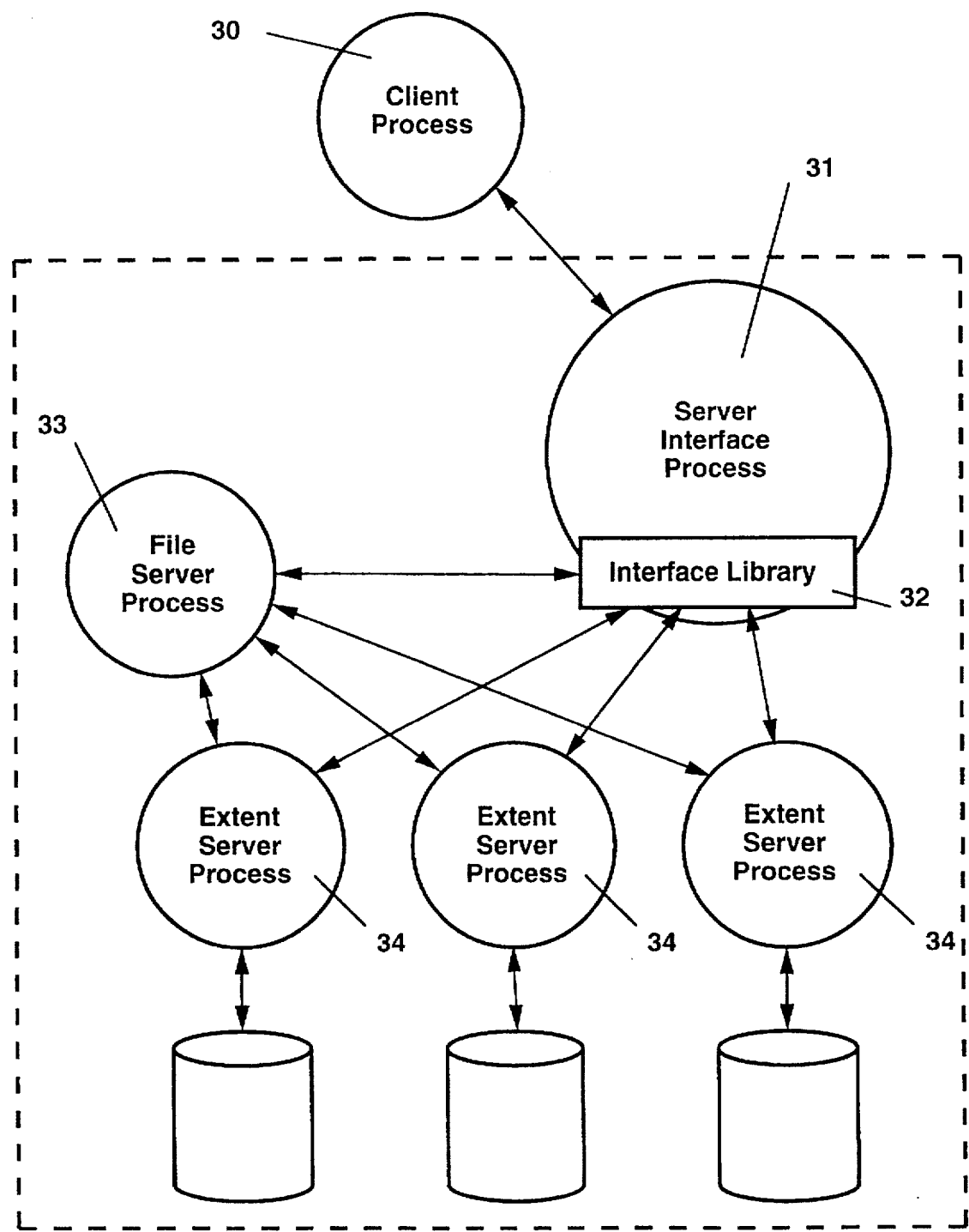
FIG. 3 shows an example of a server interface process interacting with a client process and with the file system's file and extent server processes.

The server interface processor offers the client computer, or remotely located client stations, its services which comprise file storage, file access, file transformation file processing and file recovery operations. File storage and access services are offered by the underlying parallel file system. The parallel file system comprises a file server process 23 running on any one of the processors, for example the interface processor 28, and extent server processes 24 running on the disk node processors 29 (FIG. 2). As shown in FIG. 3, the file server process 33 receives from the server interface process 31 interface library 32 file creation, file opening and file closing commands, and interacts with extent server processes 34 to create new file entries in the D/rectory and in the Distribution index Block Table described below. Extent server processes run on the disk node processors 29 and receive commands either from the file server process 23 or from the server interface process 21. Disk node processors 29 which run extent server processes 24 and slave operation processes 27 are used for parallel file storage and access functions, for extracting in parallel visualization windows from extents, and for applying in parallel geometric transformations or image processing operations to image data read from the disks.

Disks are members of a pool. As shown below, the pool membership of a disk can be identified by analyzing its DiskInfo field located in the first blocks of the disk.

Preferred layout of file structures on disks

Figure 4:
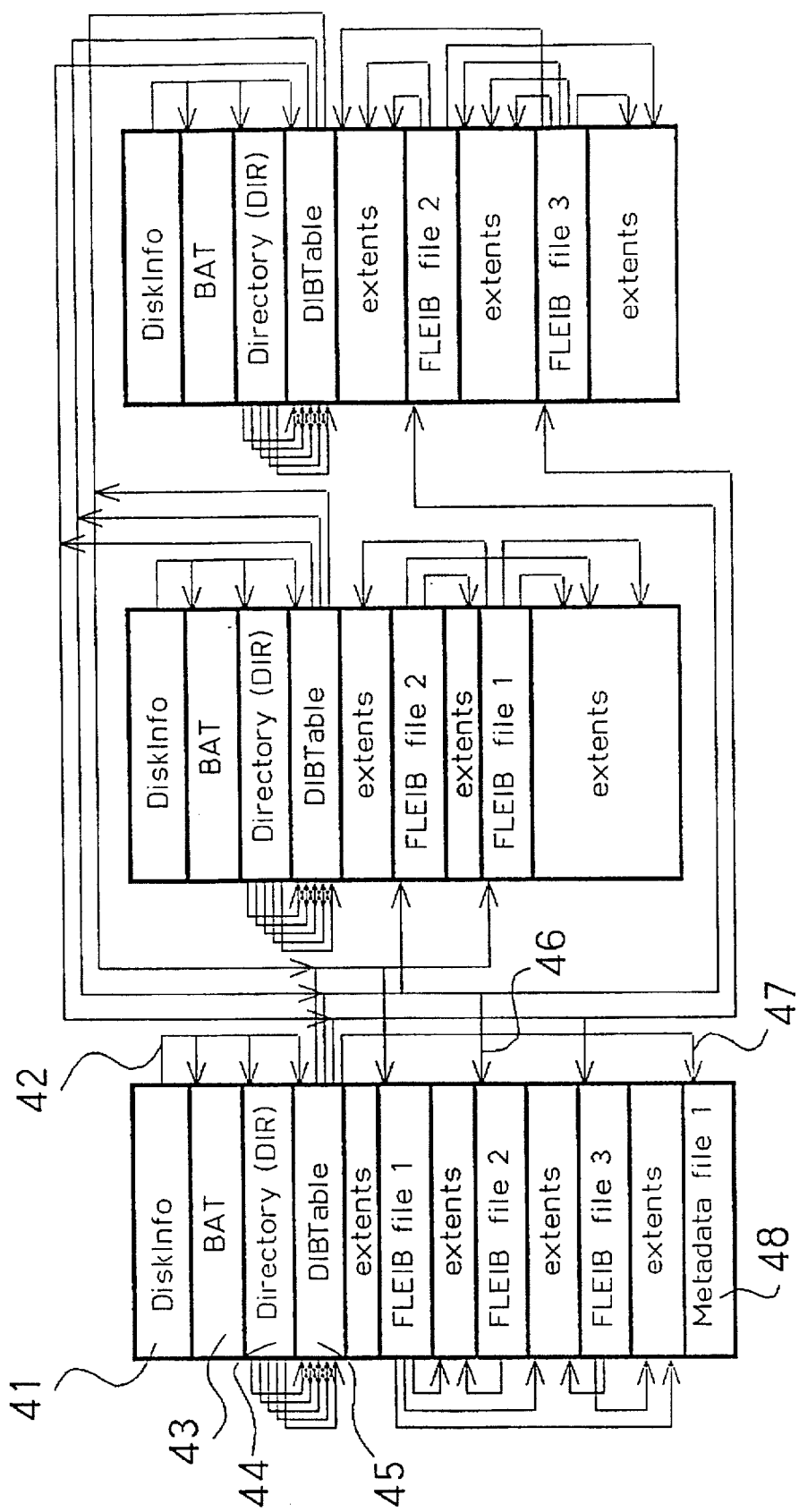
FIG. 4 gives a preferred embodiment of the disk layout of the parallel file system's data structures.
Figure 7:
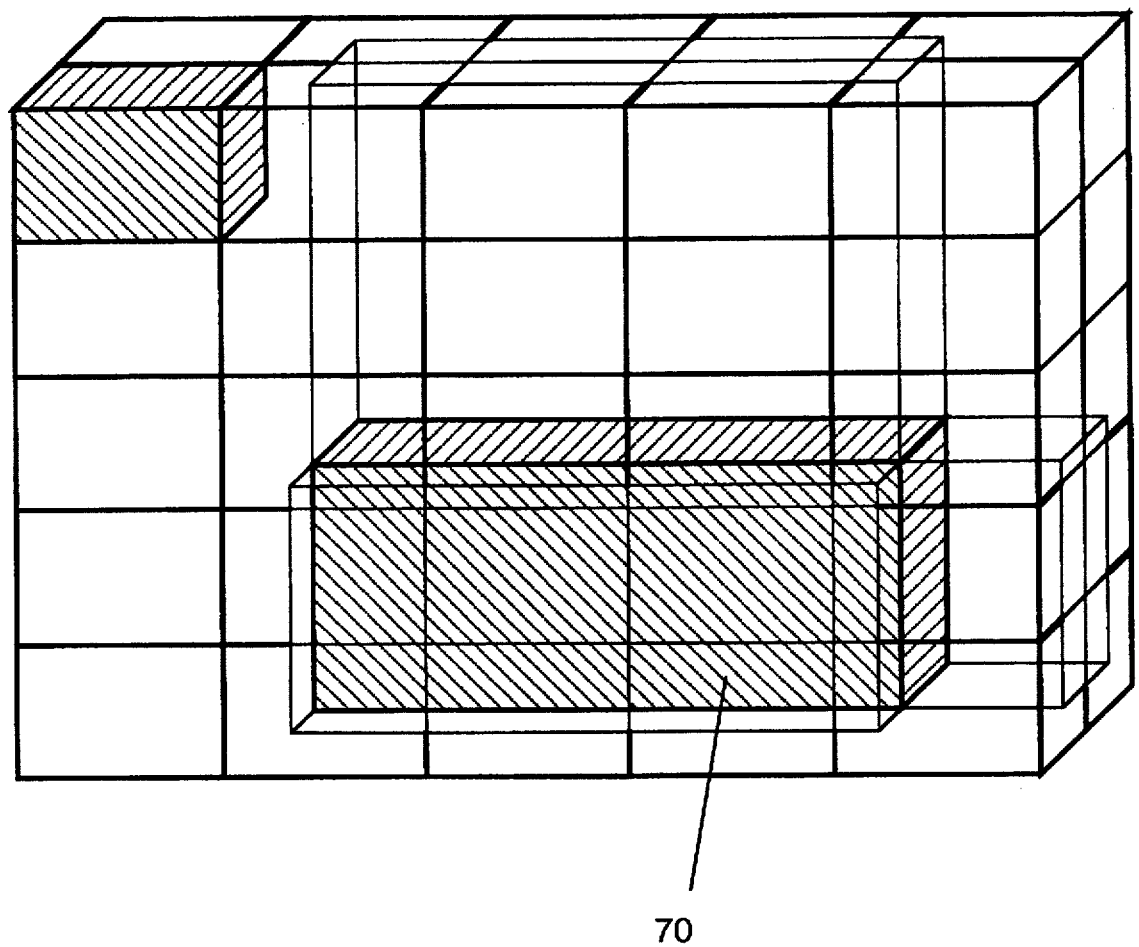
FIG. 7 shows an example of a 3-dimensional window 70 located in a 3-dimensional image file.
Figures 8A, 8B:
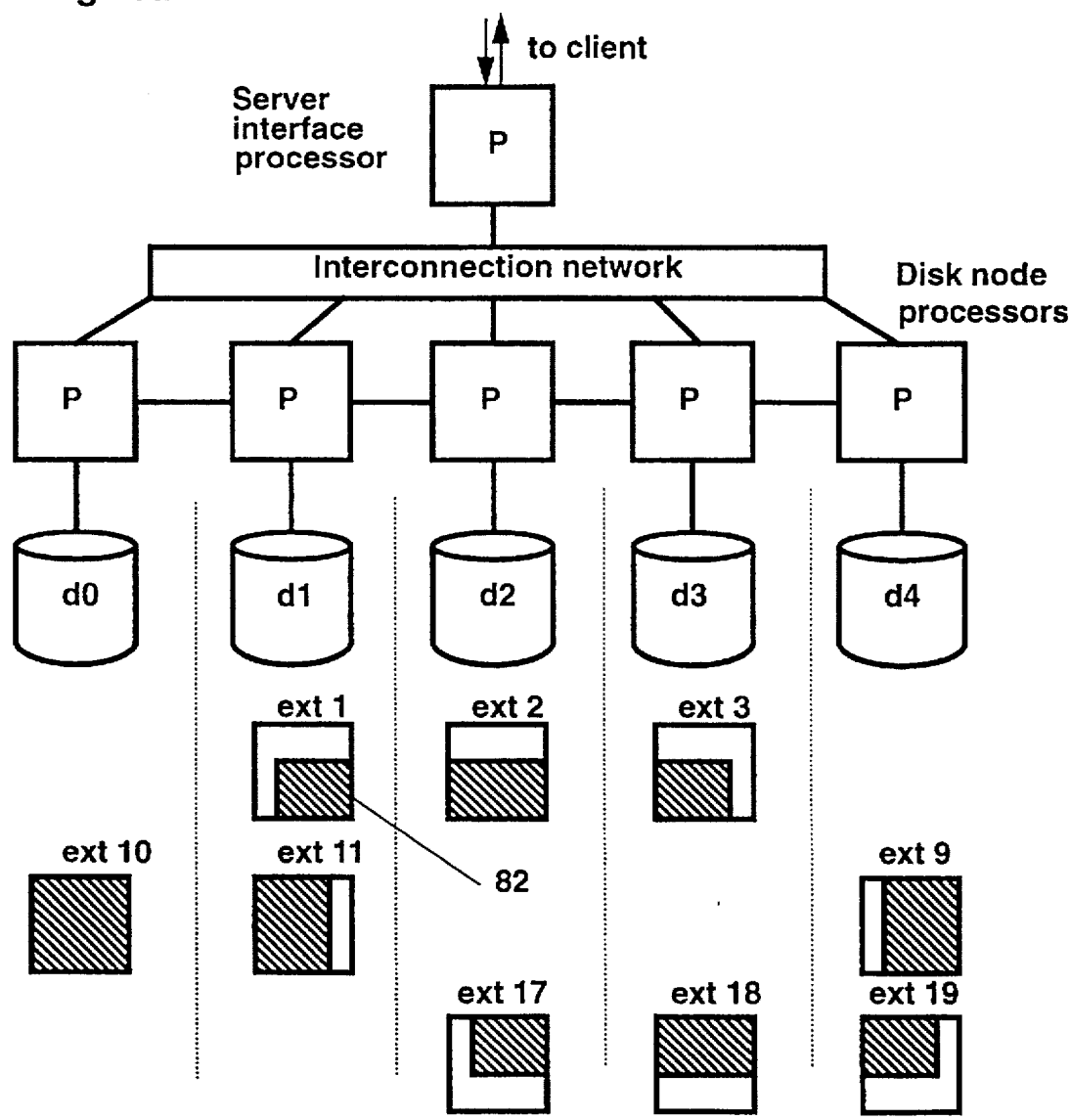
FIGS. 8a and 8b give example of a 2-dimensional image file segmented into extents striped onto 5 disks, covered by a 2-dimensional file window 81.

The parallel file system uses the following preferred data structures for the layout of information on the disks and for providing easy and quick access to files striped on multiple disks (FIG. 4). In the first part of each disk, a disk information structure 41 DiskInfo contains the current disk identifier, the size of the disk, its type, the name of the disk pool it belongs to, the disk's logical number within the pool and pointers 42 to the Block Allocation Table (BAT), to the Directory (DIR) and to the Distribution Index Block Table (DIBTable). The second part of each disk contains the Block Allocation Table (BAT) 43 made of a bitmap, where each block of the disk is represented by one bit, this bit being 0, respectively 1 depending on whether the corresponding block is free, respectively allocated. The third part of each disk contains the Directory (DIR) 44. Each entry in the directory contains one file name and a pointer to the corresponding Distribution Information Block (DIB) in the Distribution Information Block Table. The fourth part of each disk contains the Distribution Information Block Table (DIBTable) 45. Each table entry is associated with one Directory entry. An entry in the Distribution Information Block Table contains information which is generally found in index blocks of file systems and file image related information such as the image size in each dimension, the extent size in each dimension, the number of disks used by the specified file, a disk table specifying the disk identifiers of the used disks and, for each used disk, a pointer 46 to a File Local Extent Index Table (FLEIB). The DIB also contains a field for describing and pointing 47 to optional file metadata 48 (colour palette, size of compressed file extents). This field specifies the disk where the metadata is located, the metadata size in bytes and the first block on which metadata is stored. Metadata is stored in continuous disk block locations.

Space for the Block Allocation Table (BAT), the Directory (DIR), and the Distribution Index Block Table (DIBTable) is allocated at pool initialization time. The DiskInfo, BAT, DIR and DIB disk spaces are replicated on each of the disks of the pool. This enables information about the pool to be recovered from any disk. At pool initialization, the file server process initializes its list of directory entries. For each file there is File Local Extent Index Table (FLEIB) on each disk on which the file is striped. The FLEIB table includes for each locally stored extent a pointer to its starting disk block and the effective extent size in bytes. Extents are stored in continuous disk block locations.

At file creation time, a directory and a DIB entry and, on each contributing disk, a file local extent index table (FLEIB) are created. At file writing time, disk blocks are allocated for each extent to be written on that disk. The pointer to the first disk block of each extent on the disk is placed at the corresponding location of the FLEIB table.

Segmentation of image files and disk striping method

FIGS. 5a, 5b and 5c show examples of one-dimensional, 2-dimensional and 3-dimensional image files segmented into one-dimensional, 2-dimensional and 3-dimensional extents. Extents are numbered first in the x direction, then in the y direction and then in the z direction. For example, a 3-dimensional extent positioned as the ith extent in the x direction, the ith extent in y direction, and the kth extent in z direction gets the following ExtentNumber:

$$ExtentNumber(i,j,k) = k*(NumberOfExtentsInY*NbOfExtentsInX) + j*NbOfExtentsInX + i \quad (1)$$

where NbOfExtentsInX and NumberOfExtentsInY are the number of extents required to cover respectively the width (x-axis) and the height (y-axis) of one plane of the considered 3-d pixmap image. FIGS. 5a, 5b and 5c give examples of how extents are numbered.

Extents are striped onto a subset of the disks available within the disk pool (contributing disks). The number of contributing disks (NumberOfDisks parameter) as well as the disk identifiers on which the file is stored are specified at file creation time.

The extents are striped according to their extent number on the contributing disks, as specified by the following formula:

$$DiskNumber(ExtentNumber) = ExtentNumber \; MODULO \; NumberOfDisks. \quad (2)$$

At file creation time, any extent size having an integer number of pixels in each dimension can be chosen. Extents may cover a larger space than the space containing the image file information (see FIG. 5A, 5B and 5C). In order to obtain a balanced distribution of extents within a given image visualization window, the DiskNumber of one extent 61 and the diskNumber of the extent located one extent row below 62 should have a difference (disk offset) which is prime to the number of disks (FIG. 6A and 6B). Expressed mathematically, the greatest common denominator of the absolute value of this difference and the number of disks should be one:

$$GCD(|DiskNumber(ExtentNumberE[x,y]) - DiskNumber(ExtentNumber[x,y+1])|, NumberOfDisks) = 1 \quad (3)$$

The difference between an extent number and the extent number one row below it can be varied by changing the extent size in the horizontal direction (extent width). Reducing respectively enlarging the extent width increases, respectively reduces the difference between extent numbers of extents lying one below the other. As an example, FIG. 6a incorporates a file with 11 extents per extent row and FIG. 6b a file with 12 extents per extent row. According to equation (2), reduction or enlargement of extent width makes it possible to change the offset between the disk number of extents lying one below the other. FIG. 6a shows an example of a well chosen extent size where the disk offset is 2 for 9 disks. FIG. 6b shows an example of a badly chosen extent size where the disk offset is 3 for 9 disks, thus not fulfilling the condition mentioned in formula (3).

Experiments and simulations have shown that for disks having a throughput of 1 to 3 Mbytes per second, an extent size should be chosen so as to contain an amount of data between 50 Kbytes and 150 Kbytes. For image files, the size in bytes of an extent is obtained by multiplying the pixel size in bytes by the extent dimensions in all present dimensions. For example, the size of a 3-dimensional extent is computed as follows:

$$ExtentSizeInBytes = ExtentSizeInX*ExtentSizeInY*ExtentSizeInZ*NumberOfBytesPerPixel.$$

The file server process enables the initialization a disk pool made of a freely chosen number of disk nodes and of a number of disks per disk node ranging between 1 and 7 or between 1 and 15 depending on the type of SCSI bus interface used. It enables the creation of one-dimensional, 2-dimensional or 3-dimensional files by specifying their final size in each dimension, their pixel size in bytes, their extent size in each dimension, the fixed size or variable extent size mode in which the file is to be created, the size of the space to be reserved for metadata, the number of disks and the disk table specifying the identities of the contributing disks in the pool. In order to obtain good performances, the disks on which a given file is striped should preferably be located in different disk nodes.

Parallel file system interface library procedures

The server interface process 21 accesses the functions offered by the parallel file system through library procedures of the interface library 22. There is a library procedure for creating a file of a given size in each dimension, with a given extent size in each dimension. This file creation library procedure transmits the file creation command to the file server process, which finds a free entry in its directory entry list, and forwards the file creation request to extent server processes, specifying the directory entry number of the new file.

A library procedure exists for reading a 1-dimensional, 2-dimensional or 3-dimensional pixmap image window from an existing file. The pixmap image window read from the file covers a freely specified window of the full file space. In order to read a window from an image file striped on several disks, the reading procedure performs the following steps:

(1) it computes the number identifying every extent contributing to the required image file window;

(2) for every contributing extent, it computes the part covered by the required image file window 81 (extent window);

(3) it computes the disk number of each contributing extent according to formula (2);

(4) from the disk table stored in the DIB, it computes the disk identifier of each disk number;

(5) for each requested extent, it sends an extent window read request to the extent server running on the disk node connected to the disk storing the extent;

(6) it receives the required extent windows from the extent servers;

(7) it assembles all extent windows into the required image file window and returns it to the calling program.

A library procedure for writing an image file window into a previously created image file exists and works similarly to the image file window reading procedure, with the difference that extent windows are sent to the extent servers, that extent servers must access their disks to read the complete corresponding extents, write into them the extent windows and write back the complete extents to the disks.

A library procedure exists for accessing and scaling-down an image file window into a smaller window (zooming). The procedure works in a similar way as the image file window reading procedure, the only difference being that the contributing extent servers are asked to subsample their extent window obtained from the disks and to send the subsampled extent windows to the library procedure which assembles all subsampled extent windows into the required scaled-down image window.

Library procedures exist for reading and writing aligned image windows. Since aligned image windows are aligned with extent boudaries, the procedures interact with the extent server processes in order to read or to write complete extents. In the case of a file opened in variable extent size mode, requests for writing complete extents include parameters specifying the extent sizes. Similarly a request for reading complete extents also returns the effective size of each extent.

Library procedures exist for writing and reading metadata from files. There are also library procedures for closing a file, for deleting a file and for listing the files present in the directory (DIR).

Further library procedures exist for writing and reading compressed files, for applying operations on file data, for creating redundancy files and for the recovery of files from a single disk crash. The functions executed by these library procedures are described in the description which follows.

Storage of compressed image files

The invented storage server also stores compressed image files. The content of each image file extent is separately compressed, preferably at the client location. A compressed image file contains metadata which specifies the compressed size in bytes of each extent. The file system supports the storage of extents having a variable size. When a file is created in variable size extent mode, the DIB will contain information relative to the corresponding uncompressed file (image size, extent size, number of disks, disk table). In the same way as for uncompressed image files, FLEIB tables are generated at file creation time. In variable size extent mode, one set of continuous disk blocks is allocated dynamically when a compressed extent is to be written to a disk. The block address of the written extents is stored in the corresponding FLEIB table entries. Each FLEIB entry also contains a field specifying the effective compressed extent size in bytes. A library procedure exists for writing a compressed image file to a file previously created in variable extent mode. The parameters to be transferred by the server interface process are a table specifying for each compressed extent its size in bytes and a pointer to its memory location.

The library procedure sends complete extent writing requests to the extent server processes. Extent server processes allocate the disk blocks required for writing their extents, write their extents on these blocks and update the corresponding FLEIB table entries. A similar library procedure exists for reading compressed image files from the disks. If an aligned window is requested by the reading procedure, only the complete extents covered by the aligned window are requested from extent server processes.

Applying operations to file data striped onto disks

One of the advantages of the invented multiprocessor-multidisk server is its inherent ability to perform in parallel operations on data read from the disks. The server comprises an operation master process 26 located in the server interface processor 28 and operation slave processes 27 located on disk node processing units 29. The server interface process may require an operation to be applied to a given file. It transmits to the operation master process the name of the file, parameters specifying the type of the operation to be performed, the data domain (for example, the image file window) on which it is to be performed and the form in which the results are to be given back.

As an example of an operation, the rotation of oblique rectangular windows lying in 2-dimensional pixmap images is described. The server interface process specifies to the underlying master operation process an oblique rectangular window within a given image file. The rotating task consists of rotating the image part lying within the specified rectangular window by a certain rotation angle so that its sides become aligned with the horizontal and vertical axes. The master process opens the corresponding file and gets its DIB. With the information in the DIB, it computes which are the file extents covered by the rectangular window. It also computes the continuous boundary of the oblique rectangular window within each extent. File reading and operation commands are transmitted to the slave operation processes residing on the disk node processors. Each slave operation process is asked to read those extents contributing to the oblique rectangular window, which are stored on the disks controlled by its disk node processor. Slave operation processes must also read additional pixel lines or columns from neighbouring extents in order to be able to perform resampling and interpolation operations at their extents' boundary. The operation they are asked to apply to each concerned extent consists of rotating by the required rotation angle the continuous boundary obtained by intersecting the extent boundary 91 with the oblique window boundary 92. This rotated boundary contains the contribution of the current extent to the whole rotated window 93. A target pixmap 94 circumscribing said rotated boundary is defined by its width 96, height 97 and by the relative position 98 of said rotated boundary. This target pixmap is scanned pixel by pixel, scanline by scanline by the slave operation process. Pixels whose pixel centers are lying outside the rotated boundary are set to 0 (black). The position in the non-rotated original pixmap file extent corresponding to a pixel center lying in the target pixmap inside said boundary is found by inverse rotation or by an equivalent incremental operation [Hersch85]. In order to compute its intensity, bi-linear interpolation is applied to the intensities of its 4 direct neighbour pixels in the non-rotated pixmap file extent. Once the full target pixmap has been scanned and one value associated with each pixel, it is sent to the master operation process together with the parameters specifying the vertices of said rotated boundary and specifying the location of a specific bitmap position (for example the upper-left pixel center) in the global image coordinate system. The master operation process receives the resulting target pixmaps from all contributing slave operation processes. It assembles the resulting rotated window subparts by superposing the target pixmaps associated with each of the contributing extents. It transmits the resulting rotated window to the requesting server interface process. Since all disk-node processors which have extents covered by the specified oblique window contribute in parallel to the window rotation process, the result is obtained in a much shorter time than if this operation had been done on a workstation hooked to a RAID disk array.

Redundancy

Existing RAID redundancy methods [Chen90] require generating redundant disk blocks for every file writing operation. Writing operations are slowed down and disk space is required for storing the redundancy information, even if the data to be made redundant is already backed up in archive memory.

The invented storage server comprises a cheaper alternative and a more flexible redundancy scheme. At first, data files are stored without any redundancy. On request, a background redundancy file creation process is run to create for each specified data file one redundancy file. Each redundancy file is stored on different disks than its corresponding data files. Thanks to the parity extents generation method described below, data files for which redundancy files have been generated can be recovered in the case of single disk failures. This redundancy scheme works due to the fact that a data file can be striped onto a specific subset of the disks of the pool, allowing its redundancy file to be stored on a complementary disk subset of the pool.

The redundancy file contains one parity extent for each set of subsequent extents of the original file striped into different disks. Let us assume that a data file is composed of k extents striped over d disks. The first parity extent of the redundancy file is obtained by computing for each of its bytes the parity of the corresponding bytes from the first d data file extents 0 to d-1. The so-generated parity extent is the first extent of the redundancy file. The jth parity extent is obtained from data file extents j*d to (j*d)+d-1. The redundancy file contains k+d-1 DIV d parity extents stored on a set of disks on which no extent of the original data file has been stored.

The invented redundancy scheme enables data files to be recovered in the case of single disk crashes. It has the advantage of being optional, thus saving disk space by avoiding the creation of redundancy files in the case of data files already saved on archive devices. Furthermore, since the redundancy files are separated from data files, they may be generated by a background redundancy file creation process 20 active only during the idle time of the storage server.

File recovery requests in the case of single disk crashes are executed by a file recovery process 25 locating the failed disk, opening the data file and its corresponding redundancy file, reading for each set of data extents stored on different disks those extents stored on valid disks as well as the corresponding parity extent, computing from corresponding data extents and parity extents the extents located on the failed disk and transmitting the recovered file to the requesting process or storing it on a set valid disks.

While the invention has been described with reference to a preferred embodiment thereof, it will be understood by those skilled in the art that various changes in form and detail may be made without departing from the scope and spirit of the invention.

What we claim is:

1. A storage and processing server computing system apparatus for offering processing services including: parallel file storage, access, and processing functions, comprising:
   (a) a server interface connected by a communication means to at least one computer;
   (b) disk nodes, said disk nodes each comprising a disk node processor and at least one disk:
   (c) an interconnection network between said server interface and disk nodes whereby: said server interface is operable for receiving service requests from computers, further operable for analyzing, processing and decomposing service requests into storage, access and processing commands and further operable for transmitting them to said disk node processors which are operable for receiving commands, further operable for executing commands and further operable for returning results, whereby an operation is selected from the group of geometric transformations and image processing operations.

2. The storage and processing server apparatus defined in claim 1, wherein service requests from remotely located client computers comprise
   (a) 1-dimensional, 2-dimensional and 3-dimensional file storage and access requests;
   (b) file transformation and processing requests;
   (c) redundancy file creation requests;
   (d) file recovery requests; wherein
      (i) file storage and access requests comprise file creating, opening, and deleting commands and file extent storage and access commands executed in parallel by disk node processors;
      (ii) file transformation and processing requests are decomposed into file part transformation and processing operations executed in parallel by disk node processors;
      (iii) redundancy file creation requests are executed by generating from data file extents parity file extents which are stored on different disks from the disks storing the corresponding data file extents;
      (iv) file recovery requests in the case of single disk crashes are executed by reading valid data extents from the file to be recovered and redundant parity extents from its corresponding redundancy file, by computing the lacking data extents and by writing the recovered file on valid disks.

3. The storage and processing server apparatus defined in claim 2, wherein file storage and access requests comprise
   (a) file window storage and access commands, decomposed into extent window storage and access commands executed in parallel by disk node processors;
   (b) scaled-down file window storage and access commands, decomposed into scaled-down extent window storage and access commands executed in parallel by disk node processors;
   (c) file aligned window access commands, decomposed into complete extent storage and access commands executed in parallel by disk node processors.

4. The storage and processing server apparatus defined in claim 3, where aligned window access commands are decomposed into variable size extent storage and access commands executed in parallel by disk node processors.

5. The storage and processing server apparatus defined in claim 2, wherein file transformation and processing operations comprise rotation operations executed in parallel by disk node processors.

13

6. A parallel file storage, access and processing method comprising the steps of
  (a) receiving storage, access and processing requests from a client process;
  (b) decomposing file storage, access and processing requests into a plurality of access, storage and processing requests executable by disk node processors:
  (c) sending said plurality of access, storage and processing requests to disk node processors:
  (d) receiving in parallel said plurality of access, storage and processing requests by disk node processors;
  (e) executing in parallel said plurality of requests including an operation selected from the group of geometric transformations and image processing operations by accessing disks block on a plurality of disks and by applying processing operations executed by a plurality of processors;
  (f) assembling the results obtained by the parallel execution of said requests into one result:
  (g) returning said result to the requesting client process.

7. The parallel file storage, access and processing method defined in claim 6, wherein files are multidimensional files made of elementary elements, each element being composed of at least one byte, wherein multidimensional files are segmented into multidimensional extents, wherein extents are incrementally numbered as is shown in the case of the following 3-dimensional extent positioned as the ith extent in the x direction, the jth extent in y direction, and the kth extent in z direction according to the formula $$ExtentNumber(i,j,k) = k*(NbOfExtentsInY*NbOfExtentsInX) + j*NbOfExtentsInX+i,$$

wherein extents are striped into a set of available d disks according to the following formula DiskNumber(ExtentNumber)=ExtentNumber MODULO d, where NbOfExtentsInX and NbOfExtentsInY are the number of extents required to cover respectively the width (x-axis) and the height (y-axis) of one plane of the considered 3-d pixmap image.

8. A multiprocessor-multidisk storage server offering parallel file storage, access, and processing functions comprising:
  (a) a server interface comprising at least one local processor connected by a communication means to at least one computer;
  (b) disk nodes, said disk nodes each comprising a disk node processor and at least one disk, said disk being operable for storing data;
  (c) an interconnection network between said server interface and disk nodes, whereby: said server interface is operable for receiving service requests from computers, further operable for analyzing, processing and decomposing service requests into storage, access and processing commands and further operable for transmitting them to said disk node processors which are operable for receiving commands, further operable for executing commands including an operation selected from the group of geometric transformations and image processing operations and further operable for returning results.

9. A multiprocessor multidisk storage server of claim 8, where the interconnection network between the server interface and the disk nodes comprises a crossbar switch.

14

10. A multiprocessor multidisk storage server of claim 8, where the number of disk nodes and the number of disks per disk node can be independently chosen according to the requirements of the client application.

11. A multiprocessor multidisk storage server of claim 8, where aligned window access commands are decomposed into variable size extent storage and access commands executed in parallel by disk node processors.

12. A multiprocessor multidisk storage server of claim 8, where file transformation and processing operations comprise rotation operations executed in parallel by disk node processors.

13. A multiprocessor multidisk storage server of claim 8 where file storage and access requests comprise:
  (a) file window storage and access commands, decomposed into extent window storage and access commands executed in parallel by disk node processors;
  (b) scaled-down file window storage and access commands, decomposed into scaled-down extent window storage and access commands executed in parallel by disk node processors;
  (c) file aligned window access commands, decomposed into complete extent storage and access commands executed in parallel by disk node processors.

14. A parallel file storage, access and processing method using processes running on a server interface processor and processes running on disk node processing units, the method comprising the steps:
  (a) receiving by the processes running on the server interface processor storage, access and processing requests from a client process;
  (b) decomposing file storage, access and processing requests into a plurality of access, storage and processing requests executable by processes running on disk node processors:
  (c) sending said plurality of access, storage and processing requests to processes running on disk node processors:
  (d) receiving in parallel said plurality of access, storage and processing requests by processes running on disk node processors:
  (e) executing in parallel said plurality of requests including an operation selected from the group of geometric transformations and image processing operations by accessing disk data on a plurality of disks and by applying processing operations executed by processes running on a plurality of processors:
  (f) assembling the results obtained by the parallel execution of said requests into one result; and
  (g) returning said result to the requesting client process.

15. A parallel file storage, access and processing method of claim 14, where processes running in a server interface processor comprise a server interface process and at least one file server process and where processes running on disk node processing units comprise extent server processes, said server interface process being responsible for receiving file storage, access and processing requests and for transmitting file creation, opening and closing requests to the file server process and for transmitting file access requests to the extent server processes, said file server process being responsible for interacting with the extent server processes for creating new file entries in a file directory and in a distribution index block table, said distribution index table comprising file dimensionality information, file size information and file extent size information and comprising, for each disk on which a file is stored, a pointer to its file local extent table, said file local extent table comprising for each locally stored extent of a file the address of its starting block and its effective extent size.

16. A parallel file storage, access and processing method of claim 14, where files are multidimensional files made of elementary elements, each element being composed of at least one byte, where multidimensional files are segmented into multidimensional extents, where extents are incrementally numbered as is shown in the case of the following 3-dimensional extent positioned as the $i^{th}$ extent in the x direction, the $j^{th}$ extent in y direction, and the $k^{th}$ extent in z direction according to the formula:

$$\text{ExtentNumber}(i,j,k) = k*(\text{NbOfExtentsInY}*\text{NbOfExtentsInX}) + j*\text{NbOfExtentsInX} + i,$$

wherein extents are striped into a set of available d disks according to the following formula:

$$\text{DiskNumber(ExtentNumber)} = \text{ExtentNumber MODULO d},$$

where NbOfExtentsInX and NbOfExtentsInY are the number of extents required to cover respectively the width (x-axis) and the height (y-axis) of one plane of the considered 3-d pixmap image.

17. A multiprocessor parallel file system operable for storing and accessing in parallel data files striped onto multiple disks, said data files being striped onto the disks according to their dimensionality which ranges from 1 to 3, the multiprocessor parallel file system comprising:
 (a) a file server process operable for receiving file creation, opening and closing requests and operable for interaction with extent server processes regarding the creation and deletion of directory entries and distribution information block table entries;
 (b) extent server processes running on disk node processors operable for receiving file extent storage and access requests and for receiving from the file server process commands for the creation and deletion of directory entries and distribution information block table entries; and
 c) parallel file system interface library procedures for file creation, file opening, file access and file closing.

18. A parallel file system of claim 17, where as a means for efficient parallel file access, the size of the extents striped onto the disk at storage time is computed by varying the extent width so as to make the offset between the respective disk numbers of an extent lying one extent row below another extent prime in respect to the number of disks.

19. A multiprocessor-multidisk storage server offering parallel file storage, access, and processing functions comprising:
 (a) a server interface processor connected by a communication means to at least one computer, said server interface processor being operable for receiving service requests from computers, further operable for analyzing, processing and decomposing service requests into storage, access and processing commands and further operable for transmitting them to disk node processors;
 (b) disk nodes, said disk nodes each comprising a disk node processor and at least one disk, said disk node processor being operable for receiving commands, further operable for executing processing commands comprising operations selected from the group of geometric transformations and image processing operations;
 (c) an interconnection network :between said server interface and disk nodes.

20. A multiprocessor parallel file system operable for storing, accessing and operating in parallel on data files striped onto multiple disks, the multiprocessor parallel file system comprising:
 (a) a file server process operable for receiving file creation, opening and closing requests and operable for communicating with extent server processes regarding the creation and deletion of directory entries and distribution information block table entries;
 (b) extent server processes running on disk node processors operable for receiving file extent storage and access requests and for receiving from the file server process commands for the creation and deletion of directory entries and of distribution information block table entries;
 (c) operation slave processes running on disk node processors operable for receiving file reading commands and file operation commands, for executing them and for returning results;
 (d) an operation master process operable for receiving file access and file operating requests, operable for decomposing said file access and file operating requests into file reading commands and into file operating commands, for transmitting said commands to operation slave processes and for receiving the results from said operation slave processes;
 (e) a server interface process running on a server interface processor, the server interface process being operable for receiving service requests from client computers, further operable for analyzing, processing and decomposing service requests into file storage, access and file operating commands and for transmitting them to the file server, extent server and operation master processes.

21. A multiprocessor-multidisk storage sever offering parallel file storage, access, and processing functions comprising:
 (a) a server interface comprising at least one local processor connected by a communication means to at least one computer;
 (b) disk nodes, said disk nodes each comprising a disk node processor and at least one disk, said disk being operable for storing data;
 (c) an interconnection network between said server interface and disk nodes whereby said server interface is operable for receiving service requests from computers, further operable for analyzing, processing and decomposing service requests into storage, access and processing commands and further operable for transmitting them to said disk node processors which are operable for receiving commands, further operable for executing commands and further operable for returning results; and where service requests from remotely located client computers comprise:
  (A) file storage and access requests, where the dimesionality of the file is selected from The group of 1-dimension, 2-dimensions and 3-dimensions and where extents are striped onto the disks at file storage time according to The dimensionality of the file;
  (B) file transformation and processing requests; wherein:
   (i) file storage and access requests comprise file creating, opening, anti,deleting commands and file extent storage and access commands executed in parallel by disk node processors;

(ii) file transformation and processing requests are decomposed into file part transformation anti processing operations executed in parallel by disk node processors.

22. A multiprocessor multidisk storage server of claim 21 where service requests further comprise:
   (a) redundancy file creation requests;
   (b) file recovery requests; wherein
      (i) redundancy file creation requests are executed by generating from data file extents parity file extents which are stored on different disks from the disks storing the corresponding data file extents;
      (ii) file recovery requests in the case of single disk crashes are executed by reading valid data extents from the file robe recovered and redundant parity extents from its corresponding redundancy file, by computing the lacking data extents and by writing the recovered file on valid disks.

23. A multiprocessor multidisk storage server of claim 21 where, as a means for efficient parallel file access, the size of the extents striped onto the disk at storage time is computed by varying the extent width so as to make the offset between the respective disk numbers of an extent lying one extent row below another extent prime in respect to the number of disks.

24. A parallel fie storage, access and processing method using processes running on a server interface processor and processes running on disk node processing units, the method comprising the steps of:
   (a) receiving by the processes running on the server interface processor storage, access and processing requests from a client process;
   (b) decomposing file storage, access and processing requests into a plurality of access, storage and processing requests executable by processes running on disk node processors;
   (c) sending said plurality of access storage and processing requests to processes running on disk node:processors;
   (d) receiving in parallel: said plurality of access, storage and processing requests by processes running on disk node processors;
   (e) executing in parallel said plurality of requests by accessing disk data on a plurality of disks and by applying processing operations executed by process as running on a plurality of processors;
   (f) assembling the results obtained by the parallel execution of said requests into one result;
   (g) returning said result to the requesting client process, wherein
      (i) files are composed of extents, each extent comprising at least one elementary element, each elementary element being composed of at least one byte;,
      (ii) decomposing file storage, access and processing requests comprises the operations of segmenting files into extents;
      (iii) the processing operations executed by processes running on a plurality of processors comprise an operation selected from the group of geometric transformations and image processing operations.

25. A parallel file storage, access and processing method of claim 24, where multidimensional files are segmented into multidimensional extents, where extents are incrementally numbered as is shown in the ease of the following 3-dimensional extent positioned as the $i^{th}$ extent in the x direction, the $j^{th}$ extent in y direction, and the $k^{th}$ extent in z direction according to the formula:

$$ExtentNumber(i,j,k)=k*(NOfExtentsInY*NOfExtentsInX)+j*NbOfExtentsInX+i,$$

wherein extents are striped into a set of available d disks according to the following formula $$DiskNumber(ExtentNumber)=ExtentNumber\ MODULO\ d,$$

where NbOfExtentsInX and NbOfExtentsInY are the number of extents required to cover respectively the width (x-axis) and the height (y-axis) of one plane of the considered 3-d pixmap image.

26. A multiprocessor parallel file system operable for storing, accessing and processing in parallel data files striped onto multiple disks, said data files being striped onto the disks according to their dimensionality which ranges from 1 to 3, the multiprocessor parallel file system comprising:
   (a) a file server process operable for receiving file creation, opening, closing and processing requests and operable for interaction with extent serve processes regarding the creation and deletion of directory entries and distribution information block table entries;
   (b) extent server processes running on disk node processors operable for receiving file extent storage, access and processing operations requests and for receiving from the file server process commands for the creation and deletion of directory entries and distribution information block table entries;
   (c) parallel file system interface library procedures for file creation, file opening, file access and file closing; wherein
      (i) data files are composed of extents, each extent comprising at least one elementary element, each elementary element being composed of at least one byte:
      (ii) the processing operations executed by extent server processes running on a plurality of processors comprise an operation selected from the group of geometric transformations and image processing operations.

27. A parallel file system of claim 24, where data files are multidimensional files segmented into multidimensional extents, where extents are incrementally numbered as is shown in the case of the following 3-dimensional extent positioned as the $i^{th}$ extent in the x direction, the $j^{th}$ extent in y direction, and the $k^{th}$ extent in z direction according to the formula $$ExtentNumber(i,j,k)=k=(NbOfExtentsInY=NbOfExtentsInX)+j*NbOfExtentsInX+i,$$

wherein extents are striped ,into a set of available d disks according to the following formula $$DiskNumber(ExtentNumber)=ExtentNumber\ MODULO\ d,$$

where NbOfExtentsInX and NbOfExtentsInY are the number of extents required to cover respectively the width (x-axis) and the height (y-axis) of one plane of the considered 3-d pixmap image.

28. A multiprocessor parallel file system operable for storing, accessing and operating in parallel on data files striped onto multiple disks, the multiprocessor parallel file system comprising:

(a) a file server process operable for receiving file creation, opening and closing requests and operable for communicating with extent serve processes regarding the creation and deletion of directory entries and distribution information block table entries;

(b) extent server processes running on disk node processors operable for receiving file extent storage and access requests and for receiving from the file server process commands for the creation and deletion of directory entries and of distribution information block table entries;

(c) operation slave processes running on disk node processors operable for receiving file reading commands and file operation commands, for executing them and for returning results;

(d) an operation master process operable for receiving file access and file operating requests, operable for decomposing said file access and file operating requests into reading commands and into operating commands, for transmitting said commands to operation slave processes and for receiving the results from said operation slave processes; and (e) a server interface process running on a server interface processor, the server interface process being operable for receiving service requests from client computers, further operable for analyzing, processing and decomposing service requests into file storage, access and file operating commands and for transmitting them to the file server, extent server and operation master processes; wherein:

(i) data files are composed of extents, each extent comprising at least one elementary element, each elementary element being composed of at least one byte;

(ii) decomposing file access requests comprises the operation of segmenting files into extents; and (iii) file operation commands comprise an operation selected from the group of geometric transformations and image processing operations.

29. A parallel file storage and processing method offering high-bandwidth storage, access and processing of data files striped on a plurality of disks, comprising file creation, file reading, file writing, and file processing functions, whereby storage, access and processing requests are sent by client processes located outside the server, received by a server interface process located on the server interface processor, analyzed and decomposed into requests directed to a file server process, to extent server processes and to operation processes and where files are multidimensional files made of elementary elements, each element being composed by one or more bytes, wherein multidimensional files are segmented into multidimensional extents, wherein extents are incrementally numbered as is shown in the case of the following 3-dimensional extent positioned as the $h^{th}$ extent in the x direction, the $J^{th}$ extent in y direction, and the $^{th}$ extent in z direction according to the formula $$\text{ExtentNumber}(i,j,k)=k*(\text{NbOfExtentsInY}*\text{NbOfExtentsInX})+ j*\text{NbOExtentsInX}+i,$$

wherein extents are striped into a set of available d disks according to the following formula DiskNumber(ExtentNumber)=ExtentNumber MODULO d, where NbOfExtentsInX and NbOjExtentsInY are the number of extents required to cover respectively the width (x-axis) and the height (y-axis) of one plane of the considered 3-d pixmap image.

30. A parallel file storage and processing method in claim 29, where storage, access and processing of data files striped on a plurality of disks.

* * * * *